US010070173B2

(12) United States Patent
Braskich et al.

(10) Patent No.: US 10,070,173 B2
(45) Date of Patent: Sep. 4, 2018

(54) VIDEO ENCODER CUSTOMIZATION THROUGH USE OF CROWDSOURCING AND PROGRAM METADATA

(71) Applicant: ARRIS Enterprises LLC, Suwanee, GA (US)

(72) Inventors: Anthony J. Braskich, Kildeer (IL); Faisal Ishtiaq, Plainfield, IL (US); Venugopal Vasudevan, Palatine, IL (US); Myungcheol Doo, Naperville, IL (US)

(73) Assignee: ARRIS Enterprises LLC, Suwanee, GA (US)

( * ) Notice: Subject to any disclaimer, the term of this patent is extended or adjusted under 35 U.S.C. 154(b) by 88 days.

(21) Appl. No.: 15/388,795

(22) Filed: Dec. 22, 2016

(65) Prior Publication Data

US 2018/0184154 A1   Jun. 28, 2018

(51) Int. Cl.
*G06F 3/00*   (2006.01)
*G06F 13/00*   (2006.01)
*H04N 5/445*   (2011.01)
*H04N 21/431*   (2011.01)
*H04N 21/81*   (2011.01)
*H04N 21/236*   (2011.01)
*H04N 21/45*   (2011.01)
(Continued)

(52) U.S. Cl.
CPC ... *H04N 21/4316* (2013.01); *G06F 17/30828* (2013.01); *H04N 19/103* (2014.11); *H04N 21/236* (2013.01); *H04N 21/44222* (2013.01); *H04N 21/4532* (2013.01); *H04N 21/4821* (2013.01); *H04N 21/6379* (2013.01); *H04N 21/8126* (2013.01)

(58) Field of Classification Search
CPC ............. H04N 21/6175; H04N 21/812; H04N 21/23424; H04N 21/84; H04N 21/435; H04N 21/4532; H04N 21/4667; H04N 21/23418
See application file for complete search history.

(56) References Cited

U.S. PATENT DOCUMENTS 5,819,004 A   10/1998   Azadegan
8,472,741 B2   6/2013   Sakurai
(Continued)

OTHER PUBLICATIONS

PCT Search Report & Written Opinion, Re: Application No. PCT/US2017/064760, dated Mar. 5, 2018.

*Primary Examiner* — Jason P Salce
(74) *Attorney, Agent, or Firm* — Thomas A. Ward

(57) ABSTRACT

A method is provided for encoding a video program that includes receiving a video program to be encoded and evaluating the program with a profile is selected from among a plurality of profiles stored in a database. Each of the plurality of profiles include program attributes associated with one or more video programs and information pertaining to one or more static graphical elements that overlay content in the one or more video programs. The selected profile is applicable to the video program to be encoded. At least a portion of the video program is caused to be encoded based at least in part on the information in the selected profile. The encoded portion of the video program is evaluated to assess an accuracy of the selected profile and, based at least in part on the evaluation, a confidence level is assigned to the selected profile.

14 Claims, 6 Drawing Sheets

(51) Int. Cl.
    *H04N 21/482*   (2011.01)
    *H04N 21/6379*  (2011.01)
    *H04N 21/442*   (2011.01)
    *G06F 17/30*    (2006.01)
    *H04N 19/103*   (2014.01)

(56) References Cited

U.S. PATENT DOCUMENTS

| | | | |
|---|---|---|---|
| 2002/0059094 A1* | 5/2002 | Hosea | H04N 21/25891 |
| | | | 725/10 |
| 2003/0097657 A1* | 5/2003 | Zhou | H04N 7/163 |
| | | | 725/46 |
| 2006/0107302 A1* | 5/2006 | Zdepski | H04N 21/23424 |
| | | | 725/135 |
| 2008/0092159 A1* | 4/2008 | Dmitriev | G06Q 30/0269 |
| | | | 725/34 |
| 2008/0295129 A1* | 11/2008 | Laut | H04N 21/812 |
| | | | 725/34 |
| 2009/0052540 A1 | 2/2009 | Gutman | |
| 2012/0183039 A1 | 7/2012 | Rajamani et al. | |
| 2013/0332436 A1* | 12/2013 | Camplejohn | G06F 17/30867 |
| | | | 707/706 |
| 2014/0101691 A1* | 4/2014 | Sinha | G06F 17/3082 |
| | | | 725/32 |
| 2014/0270504 A1 | 9/2014 | Baum | |
| 2014/0344880 A1* | 11/2014 | Geller | H04N 21/8586 |
| | | | 725/115 |
| 2015/0254596 A1 | 9/2015 | Nayar | |
| 2016/0037176 A1 | 2/2016 | Chari | |
| 2016/0203388 A1 | 7/2016 | Li | |
| 2017/0124400 A1* | 5/2017 | Yehezkel Rohekar | |
| | | | G06K 9/00335 |

* cited by examiner

VIDEO ENCODER CUSTOMIZATION THROUGH USE OF CROWDSOURCING AND PROGRAM METADATA

BACKGROUND

Broadcast video content may include graphical elements such as branding logos. Such logos may be inserted by the content provider or distributor and generally appear in a static location in the video frames of video programs. For example, a broadcaster may insert their company logo in the lower-right corner of the video frames to indicate that the program was received from their transmission facilities. The logo typically remains present for an extended period of time (e.g., over multiple video frames) without change in intensity, color, pattern, location, etc. These logos are generally of high value to the content provider or distributor. Other examples of graphical elements may include on-screen text, particularly scrolling "tickers" often located at the bottom of the picture.

Encoders & transcoders sometimes do not produce video output with high image quality in the region of the logos or other graphical elements. Improvements in quality require knowledge of the presence and location of the graphical elements in the video frames. For example, if the encoder knows where in the frames a graphical element is located, the encoder can be configured to allocate a greater percentage of bits from its overall frame bit budget to the region where the graphical element is located. Automated techniques to locate graphical elements within a video program can be implemented using media analysis, but these techniques can be computationally expensive, and computing resources on an encoder are generally limited.

SUMMARY

In accordance with one aspect of the subject matter disclosed herein, a method for encoding a video program is provided. In accordance with the method, a video program to be encoded is received. A profile is selected from among a plurality of profiles stored in a database. Each of the plurality of profiles include program attributes associated with one or more video programs and information pertaining to one or more static graphical elements that overlay content in the one or more video programs. The selected profile is applicable to the video program to be encoded. At least a portion of the video program is caused to be encoded based at least in part on the information in the selected profile. The encoded portion of the video program is evaluated to assess an accuracy of the selected profile and, based at least in part on the evaluation, a confidence level is assigned to the selected profile.

In accordance with another aspect of the subject matter disclosed herein, a system is provided for encoding a video program. The system includes video encoder, a graphical element profile database, a graphical element profile selector and a graphical element evaluator. The video encoder is configured to encode a video program and output an encoded bitstream. The graphical element profile database is configured to store a plurality of profiles that include program attributes associated with one or more video programs and information pertaining to one or more static graphical elements that overlay content in the one or more video programs. The graphical element profile selector is configured to (i) match one or more attributes of the video program with the program attributes of the plurality of profiles stored in the graphical element profile database and selecting a profile from among the plurality of profiles based on the matching and (ii) provide the selected profile to the video encoder. The video encoder is further configured to cause at least a portion of the video program to be encoded based at least in part on the information in the selected profile. The graphical element evaluator is configured to evaluate the encoded portion of the video program to assess an accuracy of the selected profile and, based at least in part on the evaluation, a confidence level is assigned to the selected profile.

DETAILED DESCRIPTION

Described herein are techniques by which an encoder or transcoder can be modified in real-time during operation on a video program stream. Modification may include changing parameters of the encoding process so that identified regions of interest are output with a higher fidelity (e.g., reducing visible artifacts such as macroblocking or mosquito noise, for example) than under the default configuration. The terms encoder and transcoder are used interchangeably.

An entity such as a content distributor (e.g., a television station) or content owner may add a branding logo for the brand of the entity that is offering the video program to users. In some cases the branding logo is added to the original video content as an overlay. While the discussion herein will reference a logo or branding logo, it will be understand that a logo may be any graphic that is included as an overlay on video content.

Figure 1:
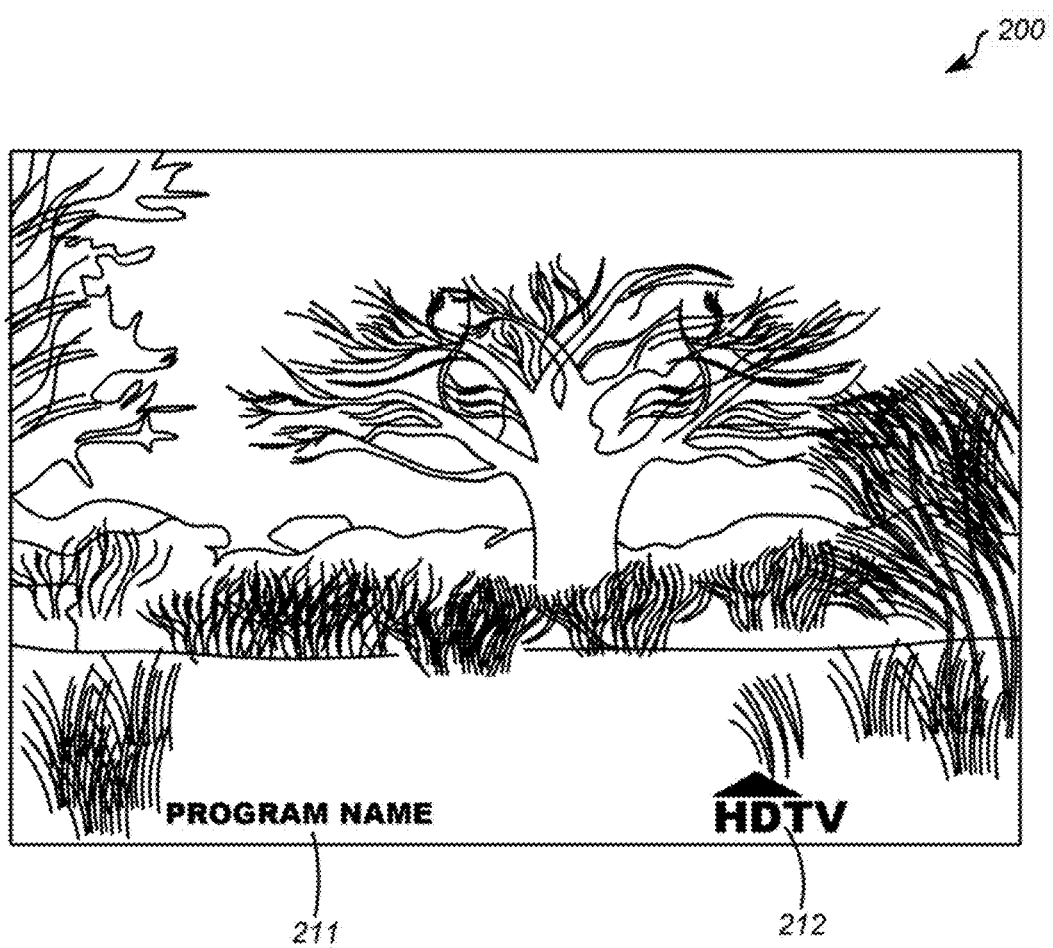
FIG. 1 depicts an example frame or image having graphical elements such as logos.

FIG. 1 depicts an example frame or image 200 having graphical elements such as logos. A proprietary rights logo 212 and a graphic providing program identification logo 211 are visible within the image 200. The frame or image 200 may be a part of a series of images, frames or pictures that define a video content item such as a broadcast program or the like. For discussion purposes the term frame will be used herein, but it may refer interchangeably with the terms picture, image, or other portion of a video content item. Frames may be identified by frame numbers within a video content item. For instance, the frame 200 shown in FIG. 1 may be frame #447 that is 15 seconds into the video content. Other identifiers may also be used, such as the time within the video content item at which the frame appears.

As explained in more detail below, embodiments of the present disclosure analyze metadata associated with a video program to facilitate the encoding of the static graphical elements that appear in the program. The metadata may include program attribute information such as the title and genre of the program, a program identifier, the time of day when the program is presented, the distributor of the video program (e.g., a channel, network or other broadcaster, a video-on-demand system) and so on. In one embodiment the metadata may be provided by an electronic program guide (EPG). As known in the art, an electronic program guide lists scheduled programs for a predetermined period of time (e.g., two weeks) and provides, among other things, information about broadcast dates and times and content information such as the aforementioned program attribute information.

Program metadata or attributes may be used in a variety of different ways to facilitate the encoding or transcoding of static graphical elements in video programs. For example, by knowing in advance the identity of the program distributor of a particular program, and knowing that that program distributor generally always includes a certain branding logo in the bottom right hand corner of the video frames, the encoder can more efficiently locate and encode the logo. As another example, the time of day at which a program is presented by a particular distributor may also be used since, for instance, the distributor may use one logo when presenting programs during the daytime and a different logo during primetime. As yet another example, a program from a given source (e.g., network broadcaster) belonging to the genre of network news may include a network logo while another program from the same source, but belonging to the genre of local news may use a different logo. Other types of metadata may be used in a similar manner.

Figure 2:
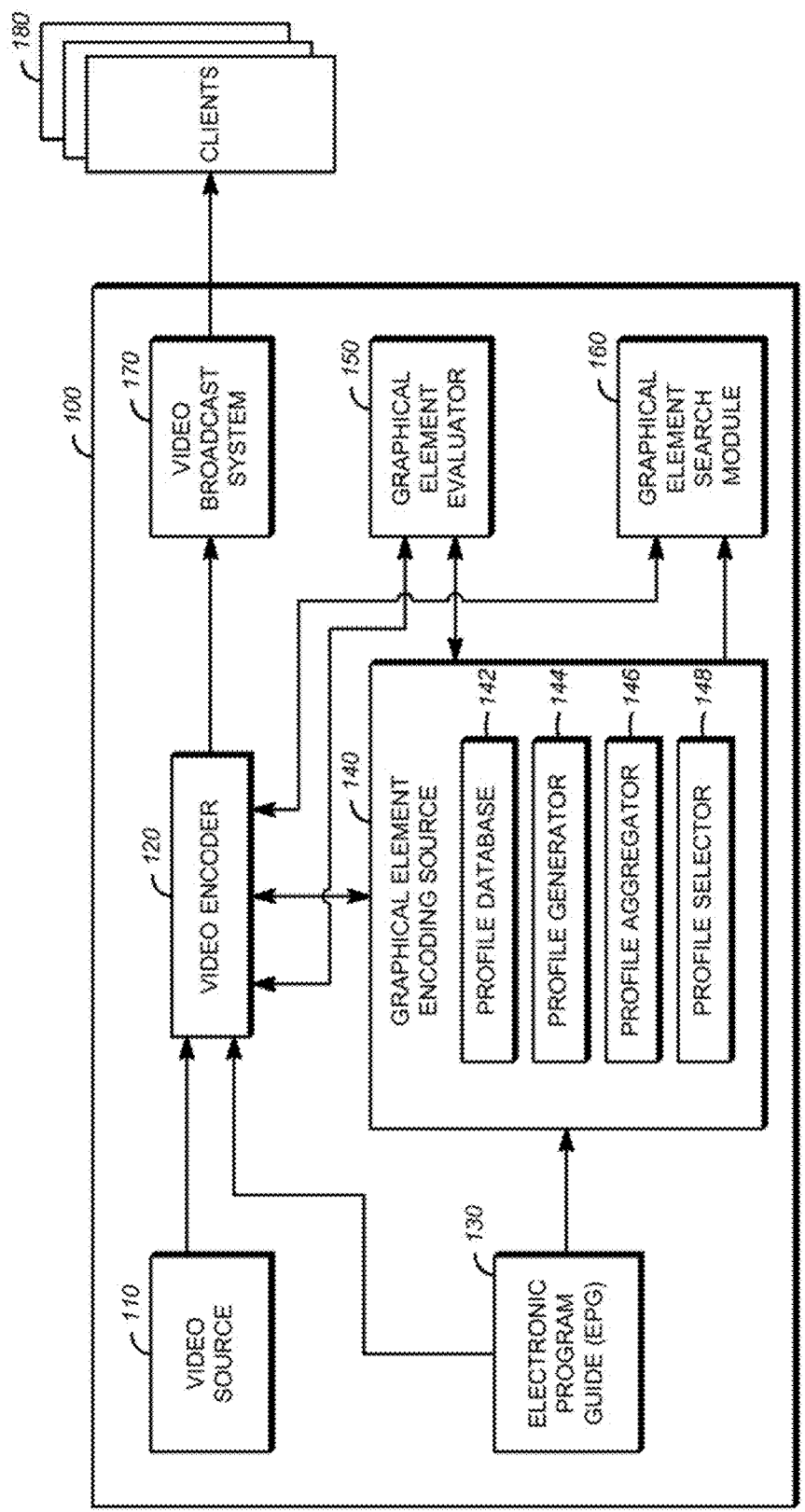
FIG. 2 shows one example of a system that provides video programs to client devices.

FIG. 2 shows one example of a system 100 that provides video programs to client devices 180. It can be appreciated that this is an aggregated view of functionality across various embodiments. Specific embodiments can vary from the particular form of FIG. 2 without departing from the scope of the disclosure.

The system 100 includes a video source 110 and EPG 130 that supplies video content and EPG data, respectively, to a video encoder 120 than encodes the frames of the video content. The encoded bit stream output from the video encoder 120 is provided to a video broadcast system 170 that may then deliver the encoded bitstream to clients 180.

As explained in more detail below, graphical element encoding source 140 is used by the video encoder 120 to facilitate the encoding of static graphical elements appearing in the video content. The graphical element encoding source 140 stores, selects and aggregates the program metadata or attributes into graphical element profiles that contain information concerning the presence and location of static graphical elements, which can be used to modify encoding parameters employed by the video encoder 120 when encoding video programs. The graphical element encoding source 140 works in conjunction with graphical element evaluator 150 and graphical element search module 160, which are used to generate graphical element information stored in the graphical element encoding source 140 and evaluate the accuracy of that information.

While in FIG. 2 the graphical element encoding source 140 is shown in operation with a single video encoder, in some embodiments graphical element encoding source 140 may be used by multiple video encoders to facilitate the encoding of static graphical elements appearing in the video content that is to be encoded. Moreover, in some embodiments the graphical element encoding source 140 may be implemented as a cloud-based service that communicates with video encoders over one or more communication networks.

In one embodiment, the graphical element encoding source 140 includes a profile generator 144 for generating the profiles from the program metadata or attributes obtained from the EPG data provided by the EPG 130. Each program may match one or more profiles. A graphical element profile selector 148 is included in the graphical element encoding source 140 to match one or more attributes of the video program to be encoded with the program attributes of the profiles stored in the graphical element profile database. The graphical element selector 148 also selects a profile from among the plurality of profiles based on the matching and provides the selected profile to the video encoder.

The profiles can be classified and arranged into categories that range from generic profiles that are applicable to many programs to progressively more narrow or specific profiles that are applicable to a smaller number of programs, and finally to the most specific profiles that are each applicable to only a single program. For instance, a generic profile may be applicable to all programs that are distributed by a particular network. In addition to the distributor, the metadata or program attributes in such a generic profile may include the expected location of a logo that is used by that particular network and possibly a logo template with a pre-encoded version of the logo. The expected location may be represented, for example, by specifying the coordinates of a rectangle, or bounding box, in terms of either absolute pixels or positions relative to the edge of the frame image. A more specific profile, on the other hand, may be applicable to all programs that are distributed by the particular network during primetime and which may include more specific program metadata or attributes. A still more specific profile may be limited in applicability to a single program such as, for instance, the nightly network news program that is broadcast at 6:30 pm on network XYZ. For a specific profile to be applicable to a particular program a match between a greater number of attributes in the video program relative to a more generic profile will generally be required.

The profile generator 144 shown in FIG. 2 can be used to create the most specific profiles for individual programs from the EPG data. The profile generator 144 stores the profiles in the profile database 142. The profile aggregator 146 can be used to generalize these profiles to create the more generic profiles by extracting data from the more specific profiles. Generalizing the profiles can comprise comparing the expected location of the logo included in each specific profile to one another. If the expected locations are the same and the bounding boxes encompassing such locations are similar in shape, then the specific profiles can be selected for generalization. When two or more profiles are selected, a generic profile can be created, which can include the common expected location along with the common metadata from the EPG data. Alternatively, the profile aggregator may also update an existing generic profile with information such as the expected location.

When the video encoder 120 first receives a video program it will examine its program attributes and use the profile selector 148 to access the profile database to identify all matching profiles. If multiple profiles are found to match with at least a certain confidence level, the profile selector 148 will generally select the most detailed profile that is most specifically tailored to that program. In some cases only the most generic profiles may be applicable. This may occur, for instance, when a new program is presented for the first time and the only profile that is found to match may be a profile that is applicable to all programs that are distributed by the particular network that is distributing the new program.

As a video program is being encoded using program attributes specified in one of the profiles, the program is evaluated by a media analysis engine in the graphical element evaluator 150 to determine in an automated manner if the profile is accurate. This evaluation may simply determine if a graphical element is in fact present in the video program at the expected location specified in the profile. Thus, the graphical element evaluator 150 does not need to search an entire frame for a graphical element, but only the portion of the frame where the graphical element is expected to be located. Accordingly, this task can be performed with relatively few computational resources. This analysis can be accomplished, for example, by comparing successive video frames for evidence of the graphical elements.

The media analysis engine in the graphical element evaluator 150 can assign a confidence level to the accuracy of the data in the profile, with the confidence being high if a good match is found between the expected location of the graphical element and the actual location of the graphical element. Conversely a relatively low degree of confidence may be assigned to the profile if the actual location of the graphical element (if such an element is even found) does not match the expected location. In addition to location, the confidence level may also be based on additional factors such as the degree to which the expected content of the graphical element as specified in the profile matches the actual content of the graphical element. As a result of the analysis, the profile's confidence level can be updated.

In addition to the evaluation by the graphical element evaluator 150, a more thorough, comprehensive analysis of the video frames being processed by the encoder 120 can be periodically performed by the graphical element search module 160 of FIG. 2 to search for any graphical elements that may be present. This search may be performed ab initio without using any information about the graphical elements in the profiles. That is, this analysis does not assume anything about the presence, location or content of any graphical elements that may be present in the video frames being analyzed. The results from this ab initio search may be used to generate or update the information in the profile. For instance, this information may be used to generate a graphical element template that may be stored in or otherwise associated with a profile.

The time interval between which the periodic, comprehensive searches for graphical elements are performed by the graphical engine search module 160 may be established by a search timer. In one embodiment, the time interval can be established based on the confidence level that has been assigned to the profile by the media analysis engine and possibly the specificity of the information stored in the profile. In particular, if the confidence level in the expected location of the graphical element as specified in the profile is low, the time interval may be reduced so that a comprehensive search is performed more frequently. Likewise, if the confidence level in the expected location of the graphical element as specified in the profile is high, the time interval may be increased so that a comprehensive search is performed less frequently. Likewise, a profile having a greater degree of specificity may cause the time interval to be increased.

In one embodiment, the comprehensive search may be performed by choosing between two alternative techniques. In one alternative, an automated technique may be used to search for graphical elements in the video program. Such techniques are well known and may be based, for example, on a comparison between sequential frames in the program to identify regions that do not change from frame to frame. In the second alternative, a manual search may be performed in which one or more individuals view selected frames of the program and visually identify any graphical elements they observe. The individuals may label or otherwise indicate the locations of the graphical elements they observe using any suitable input device or tool. For instance, the individuals may draw a box around the graphical elements using a gesture command on a touch screen, or by manipulation of a cursor on a screen via a mouse or keyboard.

In one particular embodiment, the manual process employed by the second alternative search technique may be conducted by outsourcing the task to an online community instead of, or in addition to, assigning it to an individual. This outsourcing approach is known as crowdsourcing, and is distinguished from traditional outsourcing in that the work is performed by a largely undefined group of workers rather than through one or more well-defined external workforce suppliers. In those embodiments in which crowdsourcing is employed, the process of distributing the selected frame to the workers and receiving their input may be automated using a crowdsourcing service such as Amazon Mechanical Turk, Clickworker, or CrowdSource, for example.

Figure 3:
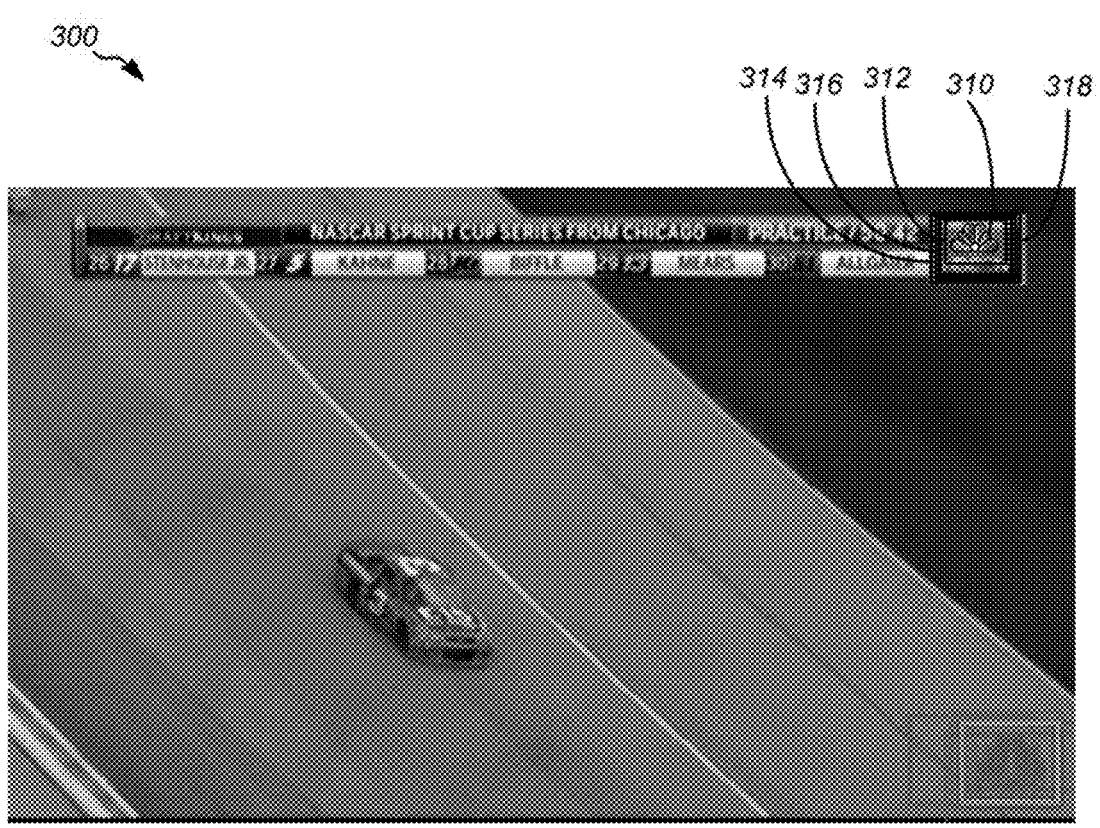
FIG. 3 shows a sample video frame in which crowdsourcing workers have identified station logos.

To conduct the search, the video encoder may extract sample frames that it has encoded and send them to the crowdsourcing service. Each frame may be analyzed by any specified number of workers (e.g., a single worker, two or more workers) and, if multiple workers are employed, their results averaged. For example, FIG. 3 shows a sample frame 300 in which workers have identified a station logo 310. As shown, the workers have placed rectangles 310, 312, 314, 318 around the logo 310. The results have been averaged to obtain the bounding box 316.

In some cases the results from the comprehensive graphical element search process can be obtained in near real-time and if the video program is still being processed, the results can be used to update the video encoder. For instance, crowdsourcing results can sometimes be returned in under 1 hour. Regardless of whether the program is still being encoded, the results can be used to populate and update the profile(s) associated with the video program.

Figure 4:
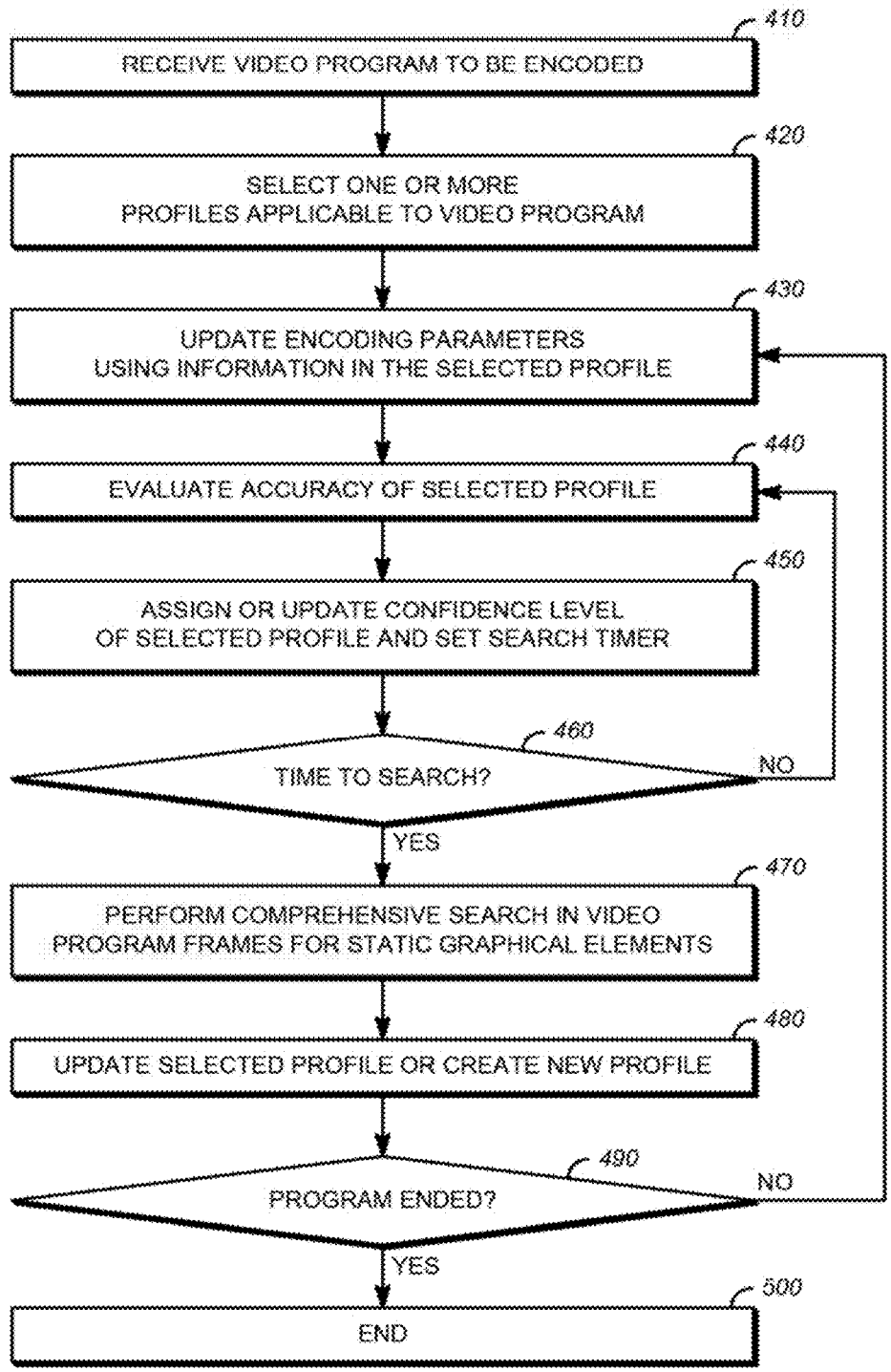
FIG. 4 is a flowchart illustrating one example of a method for customizing encoding parameters used by an encoder or transcoder for enhancing its ability to encode a video program having one or more static graphical elements.

FIG. 4 is a flowchart illustrating one example of a method for customizing encoding parameters used by an encoder or transcoder for enhancing its ability to encode a video program having one or more static graphical elements. In one embodiment the method may be performed by the system 100 shown in FIG. 2. The process begins at block 410 when the encoder receives a video program and obtains metadata associated with program, which may be extracted from the program itself and/or obtained from EPG data. Using this information, at block 420 one or more profiles are selected which are applicable to the program. In one embodiment, the profile that is most specifically tailored to the video program being encoded and which has a confidence level above a specified level is selected. The information in the profile such as the location of one or more static graphical elements that are expected to be present in the video program are used by the encoder during the encoding process at block 430 to better tailor its encoding parameters to the particular program being encoded. In addition to the location of one or more static graphic elements the profile may contain additional information such as a bounding box or a template in which the graphical element has been pre-encoded.

Next, at block 440 the accuracy of the information in the profile that has been applied to the video program is determined by examining the encoded video to see if the expected location of the graphical element(s) specified by the profile matches the actual location in the program. Based on the degree to which the information matches, a confidence level is assigned to the profile at block 450 and a search time is established or updated based on the confidence level and possibly on the degree to which the profile is specific to the program being encoded. If the search time is found to have expired at decision block 460, a comprehensive search of the video program being processed is performed at block 470 to locate and identify any graphical elements that may be present. If the search timer has not yet expired, the process returns to block 440 where the accuracy of the profile continues to be assessed by comparing it to the video program as it is being processed. The results of the comprehensive search are used to update the profile or create a new profile at block 480. If at decision block 480 the program is found to be still in the process of being encoded after the profile has been updated, the process returns to step 430 and the updated profile may be applied to the video encoder to cause the graphical element that has been detected to be encoded with greater fidelity while possibly consuming fewer computational resources to do so. If the encoding process for the program has already completed, the process terminates at block 490.

Figure 5:
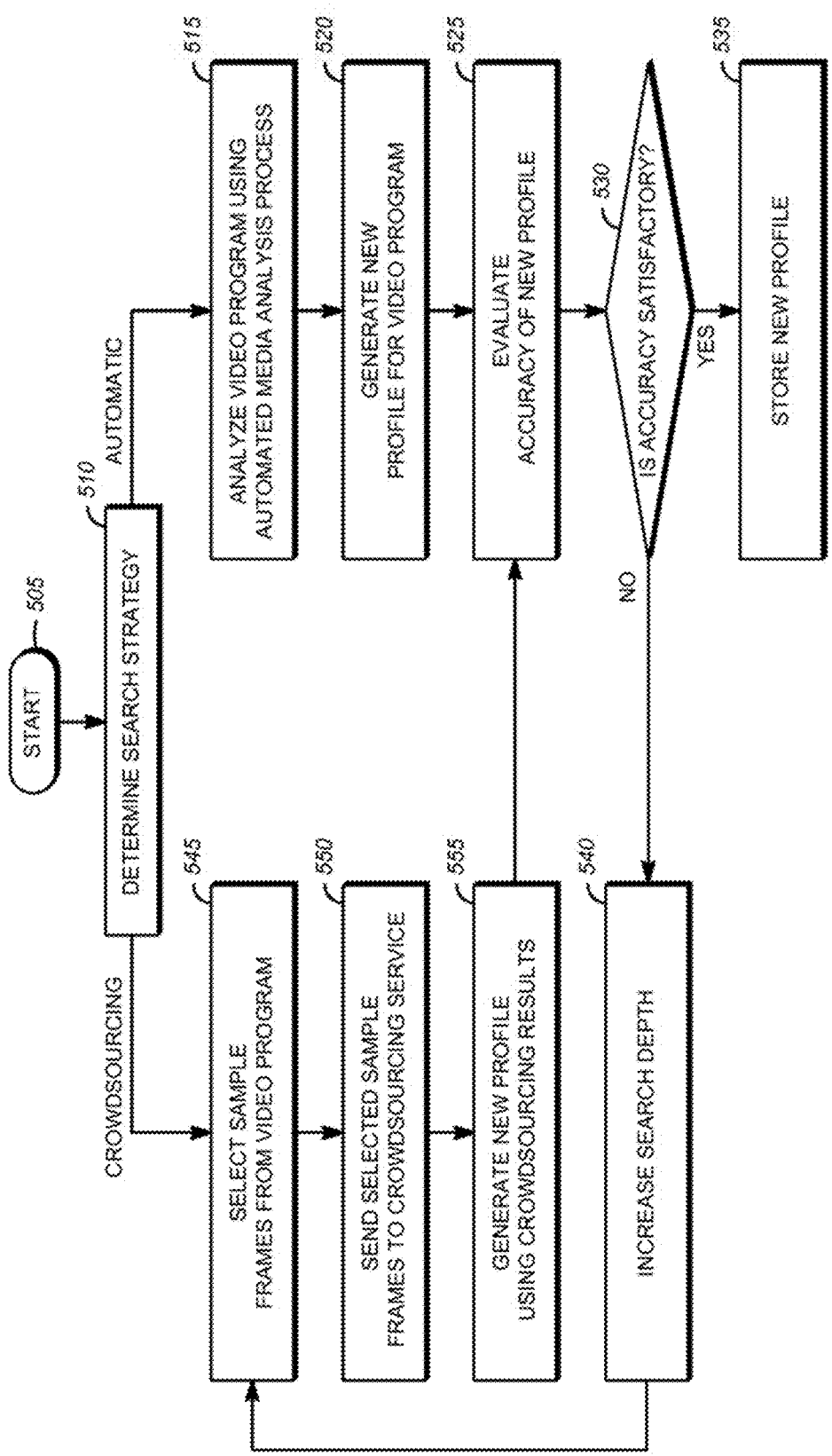
FIG. 5 is flowchart illustrating in more detail one example of the comprehensive search process shown in of FIG. 4.

FIG. 5 is flowchart illustrating in more detail one example of the comprehensive search process shown at block 470 of FIG. 4. In this particular example a choice is made between two techniques that are available to conduct the search. Also in this example the search process is used to create a new profile. However, it could be equally used to update an existing profile. As previously mentioned, in one alternative the search is conducted in an automated manner using a graphical element detector and in the other alternative the search is conducted using crowdsourcing. The process begins at block 505 and continues to decision block 510 where one of the two alternative search techniques is selected. In one particular embodiment the determination is made at least in part based on the type of search that was previously conducted during the encoding of the video program. For instance, if the previous search was conducted using crowdsourcing, then the current search may be performed in an automated manner. On the other hand, if the previous search was conducted in an automated manner, then the current search may be performed using crowdsourcing. Other factors that may be taken into account when determining the type of search that is to be performed may include, for example, the amount of computing resources that are currently available to perform an automated search, the confidence level of the previous results that have been obtained by the two technique and the availability of funds to perform a crowdsourcing search.

If an automated search technique is selected, the process continues to block 515 where the current video program stream is analyzed using an automated graphical element detector. The results, along with EPG data, are used to create a new profile for the program at block 520. The new profile is then evaluated at block 525 to determine its accuracy. The evaluation technique that is employed may be the same as used at block 440 of FIG. 4, where the accuracy of the information in the profile is determined by examining the encoded video to see if the expected location of the graphical element(s) specified by the profile matches the actual location in the program. If at decision block 530 the accuracy of profile is sufficiently great, the new profile will be stored in the profile database for later use at block 535. On the other hand, if the accuracy of the new profile is not sufficient, the search process is repeated, but with a search depth that is increased at block 540. The search depth represents the thoroughness or quality of the search such that an increased search depth attempts to increase the accuracy of the search results. The search depth can be increased in a variety of different ways. For instance, a different search technique from that previously used may be selected. If the search technique that is chosen is crowdsourcing, for example, the search depth can be increased by increasing the number of frames may be sampled and outsourced for analysis and/or by increasing the number of crowdsourcing workers analyzing each frame.

Since in the example of FIG. 5 an automated search technique was previously employed, the search depth is increased at block 540 by selecting a crowdsourcing technique. Accordingly, the process proceeds to block 545 where the encoder selects sample frames from the current video program stream and sends them to a crowdsourcing service at block 550. The crowdsourcing results, along with EPG data, are used to create a new profile for the program at block 555. The process then returns to block 525 where the new profile is then evaluated to determine its accuracy. This process can continue until there is a sufficiently high level of confidence in the accuracy of the new profile that is generated.

Upon conclusion of the search process and the storing of the new profile in the profile database, the profile aggregator may evaluate the new profile and use data contained therein to generate or update other profiles. For instance, data in the new profile may be used to update more generic profiles that are associated with the video program, such as profiles specifying the program distributor, the program distributor during a particular daypart (e.g., afternoon, primetime), or a profile specifying the program genre.

In the various examples and embodiments described above the system populates the profiles with program attributes obtained from EPG data. In other embodiments, instead of, or as a supplement to EPG data other types of program attributes and metadata may be employed. For instance, the system can infer limited EPG type information from various sources. As a simple example, the system can determine the time at which a program is being presented from a system clock and thus can incorporate daypart information into its analysis. Likewise, in some cases a video encoder, or an instance of a video encoder, may be dedicated to a single content distributor (e.g. channel) and thus it can incorporate that information into its analysis as well, even without EPG data.

Figure 6:
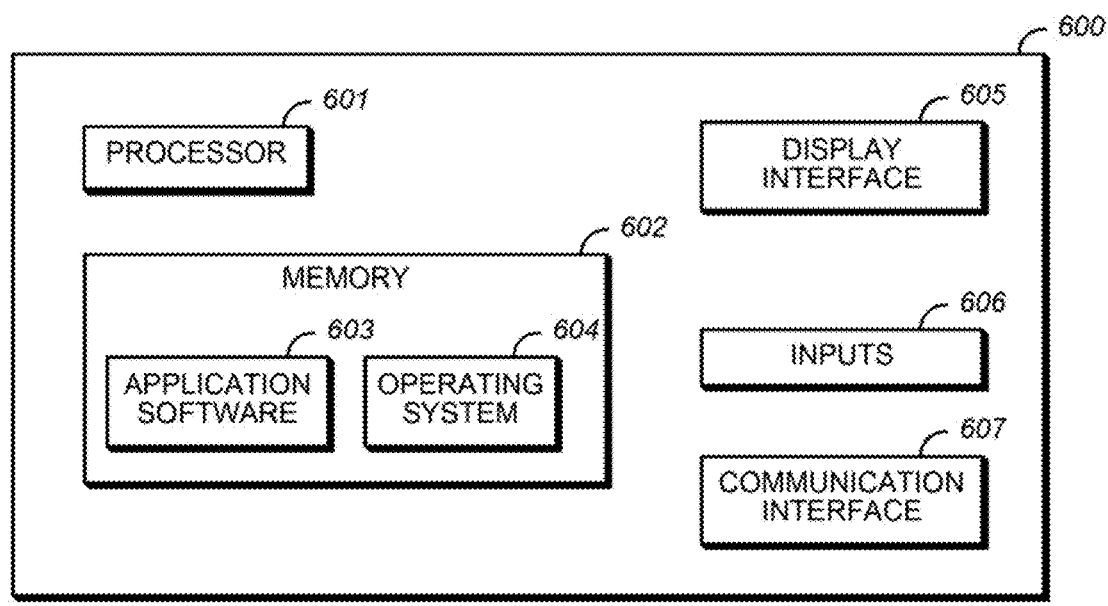
FIG. 6 shows one example of a computing-based device or system that can be used to execute the sequences of instructions required to practice various embodiments of the disclosure.

The execution of the sequences of instructions required to practice the embodiments can be performed by a computing-based device or system such as that shown in FIG. 6. The computer system provides a block diagram of functional components that can be used to enable embodiments of the present invention. In particular, the computer system may be used to implement, for instance, the video encoder 120, the graphical element encoding source 140, the graphical element evaluator 150 and/or the graphical element search module 160 shown in FIG. 2.

The computing-based device 600 comprises one or more inputs 606 which are of any suitable type for receiving media content, Internet Protocol (IP) input, activity tags, activity state information, resources or other input. The device also comprises communication interface 607 to enable the device to communicate with one or more other entity using any suitable communications medium.

Computing-based device 600 also comprises one or more processors 601 which may be microprocessors, controllers or any other suitable type of processors for processing computing executable instructions to control the operation of the device in order to provide a search augmentation system. Platform software comprising an operating system 604 or any other suitable platform software may be provided at the computing-based device to enable application software 603 to be executed on the device.

The computer executable instructions may be provided using any computer-readable media, such as memory 602. The memory is of any suitable type such as random access memory (RAM), a disk storage device of any type such as a magnetic or optical storage device, a hard disk drive, or a CD, DVD or other disc drive. Flash memory, EPROM or EEPROM may also be used.

An output is also provided such as an audio and/or video output to a display system integral with or in communication with the computing-based device. A display interface 605 is provided to control a display device to be used in conjunction with the computing device. The display system may provide a graphical user interface, or other user interface of any suitable type.

As disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices, or other computer-readable storage media for storing information. The term "computer-readable storage medium" includes, but is not limited to, portable or fixed storage devices, optical storage devices, wireless channels, a SIM card, other smart cards, and various other mediums capable of storing, containing, or carrying instructions or data. However, computer readable storage media do not include transitory forms of storage such as propagating signals, for example.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable storage medium and executed by one or more processors.

It will be appreciated that some embodiments of the subject matter described herein may be comprised of specialized processors for efficiently encoding video such as field programmable gate arrays (FPGAs) and unique stored program instructions (including both software and firmware) that implement, in conjunction with certain non-processor circuits, some, most, or all of the functions described herein. Alternatively, some or all functions could be implemented in one or more application specific integrated circuits (ASICs), in which each function or some combinations of certain of the functions are implemented as specialized logic.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method for encoding a video program, comprising:
receiving a video program to be encoded;
selecting a profile from among a plurality of profiles stored in a database, each of the plurality of profiles including program attributes associated with one or more video programs and information pertaining to one or more static graphical elements that overlay content in the one or more video programs, the selected profile being applicable to the video program to be encoded;
causing at least a portion of the video program to be encoded based at least in part on the information in the selected profile;
periodically conducting a search of selected frames in the video program for one or more static graphical elements contained therein and updating the selected profile or creating a new profile based at least in part on results of the search, wherein periodically conducting a search of selected frames in the video program for one or more static graphical elements contained therein includes selecting from among a plurality of techniques for conducting the search, a first of the techniques being an automated search and a second of the techniques being a manual search performed by workers of a crowdsourcing service who visually inspect the selected frames for a presence of one or more graphical elements and wherein the selected search technique is different from a search technique used to conduct an immediately preceding one of the periodic searches; and
evaluating the encoded portion of the video program to assess an accuracy of the selected profile and, based at least in part on the evaluation, assigning a confidence level to the selected profile.

2. The method of claim 1, wherein the causing at least a portion of the video program to be encoded includes causing at least a portion of the video program to be encoded based at least in part on the new profile or the updated selected profile.

3. The method of claim 1, further comprising obtaining at least a subset of the program attributes included in at least one of the profiles from electronic program guide (EPG) data.

4. The method of claim 1, wherein selecting a profile from among a plurality of profiles includes selecting a profile from among a plurality of applicable profiles that are applicable to the video program to be encoded, the selected profile being one of the applicable profiles that is most specifically tailored to the video program to be encoded, remaining ones of the applicable profiles being applicable to a greater number of video programs than the selected profiles.

5. The method of claim 4, wherein a first of the plurality of applicable profiles are applicable to all video programs distributed by a specified content distributor, the selected profile being applicable only to a reduced subset of all the video programs distributed by the specified content distributor.

6. The method of claim 1, wherein periodically conducting a search of selected frames in the video program for one or more static graphical elements contained therein includes sending the selected frames to a crowdsourcing service to be visually inspected for a presence of one or more graphical elements.

7. The method of claim 1, wherein a frequency with which the search is periodically conducted is based at least in part on the confidence level assigned to the selected profile.

8. The method of claim 1, wherein the information pertaining to the one or more video programs includes a location of one of the static graphical elements in frames of the video program.

9. A system for encoding a video program, comprising:
a video encoder configured to encode a video program and output an encoded bitstream;
a graphical element profile database configured to store a plurality of profiles that include program attributes associated with one or more video programs and information pertaining to one or more static graphical elements that overlay content in the one or more video programs;

a graphical element profile selector for (i) matching one or more attributes of the video program with the program attributes of the plurality of profiles stored in the graphical element profile database and selecting a profile from among the plurality of profiles based on the matching and (ii) providing the selected profile to the video encoder, wherein the video encoder is further configured to cause at least a portion of the video program to be encoded based at least in part on the information in the selected profile;

a graphical element search module for periodically conducting a search of selected frames in the video program for one or more static graphical elements contained therein and updating the selected profile or creating a new profile based at least in part on results of the search, wherein the graphical element search module is configured to select from among a plurality of techniques for conducting the search, a first of the techniques being an automated search and a second of the techniques being a manual search performed by workers of a crowdsourcing service who visually inspect the selected frames for a presence of one or more graphical element and wherein the selected search technique is different from a search technique used to conduct an immediately preceding one of the periodic searches; and a graphical element evaluator for evaluating the encoded portion of the video program to assess an accuracy of the selected profile and, based at least in part on the evaluation assigning a confidence level to the selected profile.

10. The system of claim 9, wherein the graphical element profile selector is further configured to provide the new profile or the updated selected profile to the video encoder while the video program is being encoded.

11. The system of claim 9 further comprising a profile generator for populating the profiles with the program attributes, the profile generator being configured to obtain at least a subset of the program attributes included in at least one of the profiles from electronic program guide (EPG) data.

12. The system of claim 9, wherein the plurality of profiles includes a plurality of applicable profiles that are applicable to the video program to be encoded, the graphical element profile selector being configured to select a profile that is most specifically tailored to the video program to be encoded, remaining ones of the applicable profiles being applicable to a greater number of video programs than the selected profiles.

13. The system of claim 9, wherein the graphical element search module is configured to periodically conduct the search of selected frames for one or more static graphical elements contained therein by causing the selected frame to be sent to a crowdsourcing service to be visually inspected for a presence of one or more graphical elements.

14. The system of claim 9, wherein a frequency with which the search is periodically conducted is based at least in part on the confidence level assigned to the selected profile.

* * * * *